(12) United States Patent
Takiduka

(10) Patent No.: US 8,687,117 B2
(45) Date of Patent: Apr. 1, 2014

(54) DATA TRANSMISSION DEVICE, DATA RECEPTION DEVICE, DATA TRANSMISSION METHOD, AND DATA RECEPTION METHOD

(75) Inventor: Hiroshi Takiduka, Tokyo (JP)

(73) Assignee: Sony Corporation (JP)

( * ) Notice: Subject to any disclaimer, the term of this patent is extended or adjusted under 35 U.S.C. 154(b) by 161 days.

(21) Appl. No.: 13/107,238

(22) Filed: May 13, 2011

(65) Prior Publication Data

US 2011/0285906 A1    Nov. 24, 2011

(30) Foreign Application Priority Data

May 21, 2010   (JP) ................................ P2010-117257

(51) Int. Cl.
- *H04N 7/00*    (2011.01)
- *H04N 5/445*   (2011.01)
- *H04N 9/80*    (2006.01)

(52) U.S. Cl.
USPC ............ 348/468; 348/473; 348/563; 386/241

(58) Field of Classification Search
None
See application file for complete search history.

(56) References Cited

U.S. PATENT DOCUMENTS

2005/0073608 A1* 4/2005 Stone et al. ................... 348/468
2009/0110082 A1* 4/2009 Ahmed et al. ........... 375/240.27
2009/0317059 A1* 12/2009 Chen et al. ...................... 386/95

OTHER PUBLICATIONS

Hitachi et al: "HDMI Specification Version 1.3a", Internet Citation, Nov. 10, 2006 XP 002476103.
European Search Report EP 11161872, dated Aug. 1, 2011.
High-Definition Multimedia Interface Specification Version 1.4, Jun. 5, 2009, pp. ii-197, Supplement 1 Consumer Electronics Control (CEC), pp. CEC I-127, and Supplement 2 HDMI Ethernet and Audio Return Channel (HEAC) pp. HEAC i-72.

* cited by examiner

*Primary Examiner* — Jefferey Harold
*Assistant Examiner* — Sean Haiem
(74) *Attorney, Agent, or Firm* — Lerner, David, Littenberg, Krumholz & Mentlik, LLP

(57) ABSTRACT

There is provided a data transmission device including a transmission unit which transmits, via a transmission path to a data reception device, video data received by the data transmission device and packetizes closed caption data which was received by the data transmission device and transmits the closed caption data packetized via the transmission path to the data reception device, where the transmission path is constituted by a transmission channel included in a High Definition Multimedia Interface (HDMI) cable.

12 Claims, 23 Drawing Sheets

FIG.4

HDMI PIN ASSIGNMENT (IN CASE OF TYPE-A)

| PIN | Signal Assignment |
|---|---|
| 1 | TMDS Data2+ |
| 3 | TMDS Data2− |
| 5 | TMDS Data1 Shield |
| 7 | TMDS Data0+ |
| 9 | TMDS Data0− |
| 11 | TMDS Clock Shield |
| 13 | CEC |
| 15 | SCL |
| 17 | DDC/CEC Ground / HEAC Shield |
| 19 | Hot Plug Detect / HEAC− |

| PIN | Signal Assignment |
|---|---|
| 2 | TMDS Data2 Shield |
| 4 | TMDS Data1+ |
| 6 | TMDS Data1− |
| 8 | TMDS Data0 Shield |
| 10 | TMDS Clock+ |
| 12 | TMDS Clock− |
| 14 | Utility / HEAC+ |
| 16 | SDA |
| 18 | +5V Power |

FIG.11

| Syntax | No. of Bits | Format |
|---|---|---|
| cc_data() { | | |
| reserved | 1 | '1' |
| process_cc_data_flag | 1 | bslbf |
| zero_bit | 1 | '0' |
| cc_count | 5 | uimsbf |
| reserved | 8 | '11111111' |
| for ( i=0 ; i<cc_count ; i++ ) { | | |
| one_bit | 1 | '1' |
| reserved | 4 | '1111' |
| cc_valid | 1 | bslbf |
| cc_type | 2 | bslbf |
| cc_data_1 | 8 | bslbf |
| cc_data_2 | 8 | bslbf |
| } | | |
| } | | | change and map.

map directly.

FIG.12

| Packet Type Value | Packet Type |
|---|---|
| 0x00 | Null |
| 0x01 | Audio Clock Regeneration (N/CTS) |
| 0x02 | Audio Sample (L-PCM and IEC 61937 compressed formats) |
| 0x03 | General Control |
| 0x04 | ACP Packet |
| 0x05 | ISRC1 Packet |
| 0x06 | ISRC2 Packet |
| 0x07 | One Bit Audio Sample Packet |
| 0x08 | DST Audio Packet |
| 0x09 | High Bitrate (HBR) Audio Stream Packet (IEC 61937) |
| 0x0A | Gamut Metadata Packet |
| 0x0B | Closed Caption Packet |
| 0x80+InfoFrame Type | InfoFrame Packet |
| 0x81 | Vendor-Specific InfoFrame |
| 0x82 | AVI InfoFrame |
| 0x83 | Source Product Descriptor InfoFrame |
| 0x84 | Audio InfoFrame |
| 0x85 | MPEG Source InfoFrame |

FIG.13A

| Byte/Bit# | 7 | 6 | 5 | 4 | 3 | 2 | 1 | 0 |
|---|---|---|---|---|---|---|---|---|
| HB0 | 0 | 0 | 0 | 0 | 0 | 0 | 0 | 1 |
| HB1 | Rsvd(0) | Packet_seq. | | | | | | |
| HB2 | Rsvd(0) | Length | | | | | | |

FIG.13B

| Byte/Bit# | 7 | 6 | 5 | 4 | 3 | 2 | 1 | 0 |
|---|---|---|---|---|---|---|---|---|
| PB00-27 | CC data bytes 0 through 27 | | | | | | | |

FIG.14

| Byte/Bit# | 7 | 6 | 5 | 4 | 3 | 2 | 1 | 0 |
|---|---|---|---|---|---|---|---|---|
| PB #n | | | Rsvd(0) | | | cc_valid | cc_type | |
| PB #n+1 | | | | | cc_data_1 | | | |
| PB #n+2 | | | | | cc_data_2 | | | |

FIG.15

| cc_Type | Contents |
|---|---|
| 00 | CEA-608-E line 21 field 1 closed captions |
| 01 | CEA-608-E line 21 field 2 closed captions |
| 10 | DTVCC Channel Packet Data |
| 11 | DTVCC Channel Packet Start |

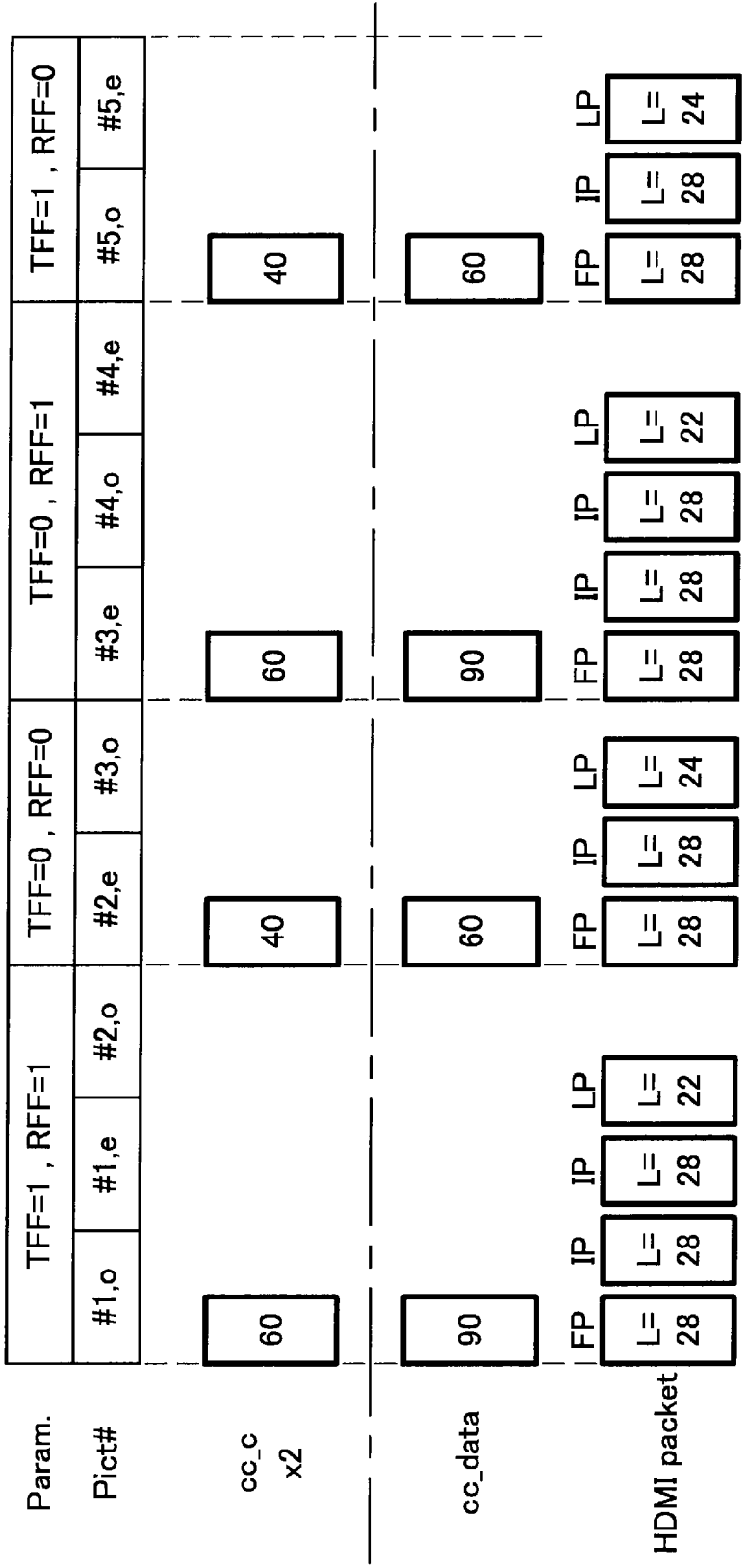

| Byte# | data |
|---|---|
| HB0 | 0x0b (CC packet) |
| HB1 | 0x00 |
| HB2 | 0x3C (Pkt_Seq=1, Pkt_Len=28) |

| Byte# | data |
|---|---|
| PB0 | 0x04 (cc_v=1, cc_t=00) |
| PB1 | CEA-608 datastream field1 |
| PB2 | CEA-608 datastream field1 |
| PB3 | 0x05 (cc_v=1, cc_t=01) |
| PB4 | CEA-608 datastream field2 |
| PB5 | CEA-608 datastream field2 |
| PB6 | 0x07 (cc_v=1, cc_t=11) |
| PB7 | byte#1 : DTVCC Packet Header |
| PB8 | byte#2 : DTVCC Packet Data |
| PB9 | 0x06 (cc_v=1, cc_t=10) |
| PB10 | byte#3 : DTVCC Packet Data |
| PB11 | byte#4 : DTVCC Packet Data |
| .. | .. |
| PB27 | 0x06 (cc_v=1, cc_t=10) |

LP

| Byte# | data |
|---|---|
| HB0 | 0x0b (CC packet) |
| HB1 | 0x00 |
| HB2 | 0x5C (Pkt_Seq=2, Pkt_Len=2) |

| Byte# | data |
|---|---|
| PB0 | byte#35 : DTVCC Packet Data |
| PB1 | byte#36 : DTVCC Packet Data |
| PB2-27 | — |

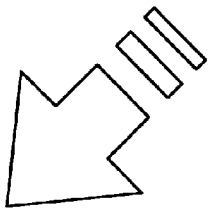

| i+1 | Marler_bits | cc_valid | cc_type | cc_data_1 | cc_data_2 |
|---|---|---|---|---|---|
| 1 | 11111 | 1 | 00 | CEA-608 datastream, field1 | CEA-608 datastream, field1 |
| 2 | 11111 | 1 | 01 | CEA-608 datastream, field2 | CEA-608 datastream, field2 |
| 3 | 11111 | 1 | 11 | byte#1 : DTVCC Packet Header | byte#2 : DTVCC Packet Data |
| 4 | 11111 | 1 | 10 | byte#3 : DTVCC Packet Data | byte#4 : DTVCC Packet Data |
| .. | .. | .. | .. | .. | .. |
| 20 | 11111 | 1 | 10 | byte#35 : DTVCC Packet Data | byte#36 : DTVCC Packet Data |

| Byte# | data |
|---|---|
| HB0 | 0x0b (CC packet) |
| HB1 | 0x00 |
| HB2 | 0x3C (Pkt_Seq=1, Pkt_Len=28) |

| Byte# | data |
|---|---|
| PB0 | 0x05 (cc_v=1, cc_t=01) |
| PB1 | CEA-608 datastream field2 |
| PB2 | CEA-608 datastream field2 |
| PB3 | 0x04 (cc_v=1, cc_t=00) |
| PB4 | CEA-608 datastream field1 |
| PB5 | CEA-608 datastream field1 |
| PB6 | 0x06 (cc_v=1, cc_t=10) |
| PB7 | byte#125 : DTVCC Packet Data |
| PB8 | byte#126 : DTVCC Packet Data |
| PB9 | 0x06 (cc_v=1, cc_t=10) |
| PB10 | byte#127 : DTVCC Packet Data |
| PB11 | byte#128 : DTVCC Packet Data |
| PB12 | 0x07 (cc_v=1, cc_t=11) |
| ... | ... |
| PB27 | 0x06 (cc_v=1, cc_t=10) |

LP

| Byte# | data |
|---|---|
| HB0 | 0x0b (CC packet) |
| HB1 | 0x00 |
| HB2 | 0x5C (Pkt_Seq=2, Pkt_Len=2) |

| Byte# | data |
|---|---|
| PB0 | byte#31 : DTVCC Packet Data |
| PB1 | byte#32 : DTVCC Packet Data |
| PB2-27 | - |

| i+1 | cc_valid | cc_type | cc_data_1 | cc_data_2 |
|---|---|---|---|---|
| 1 | 1 | 01 | CEA-608 datastream, field2 | CEA-608 datastream, field2 |
| 2 | 1 | 00 | CEA-608 datastream, field1 | CEA-608 datastream, field1 |
| 3 | 1 | 10 | byte#125 : DTVCC Packet Data | byte#126 : DTVCC Packet Data |
| 4 | 1 | 10 | byte#127 : DTVCC Packet Data | byte#128 : DTVCC Packet Data |
| 5 | 1 | 11 | byte#1 : DTVCC Packet Header | byte#2 : DTVCC Packet Data |
| 6 | 1 | 10 | byte#3 : DTVCC Packet Data | byte#4 : DTVCC Packet Data |
| 7 | 1 | 10 | byte#5 : DTVCC Packet Data | byte#6 : DTVCC Packet Data |
| 8 | 1 | 10 | byte#7 : DTVCC Packet Data | byte#8 : DTVCC Packet Data |
| ... | ... | ... | ... | ... |
| 20 | 1 | 10 | byte#31 : DTVCC Packet Data | byte#32 : DTVCC Packet Data |

| Byte# | data |
|---|---|
| HB0 | 0x0b (CC packet) |
| HB1 | 0x00 |
| HB2 | 0x3C (Pkt_Seq=1, Pkt_Len=28) |

| Byte# | data |
|---|---|
| PB0 | 0x04 (cc_v=1, cc_t=00) |
| PB1 | CEA-608 datastream field1 |
| PB2 | CEA-608 datastream field1 |
| PB3 | 0x05 (cc_v=1, cc_t=01) |
| PB4 | CEA-608 datastream field2 |
| PB5 | CEA-608 datastream field2 |
| PB6 | 0x03 (cc_v=0, cc_t=11) |
| PB7 | 0x00 = END OF PACKET |
| PB8 | 0x00 = END OF PACKET |
| PB9 | 0x00 (cc_v=0, cc_t=00) |
| PB10 | 0x00 = padding |
| PB11 | 0x00 = padding |
| PB12 | 0x07 (cc_v=1, cc_t=11) |
| .. | .. |
| PB27 | 0x06 (cc_v=1, cc_t=10) |

LP

| Byte# | data |
|---|---|
| HB0 | 0x0b (CC packet) |
| HB1 | 0x00 |
| HB2 | 0x5C (Pkt_Seq=2, Pkt_Len=2) |

| Byte# | data |
|---|---|
| PB0 | byte#5 : DTVCC Packet Data |
| PB1 | byte#6 : DTVCC Packet Data |
| PB2-27 | — |

| i+1 | cc_valid | cc_type | cc_data_1 | cc_data_2 |
|---|---|---|---|---|
| 1 | 1 | 00 | CEA-608 datastream, field1 | CEA-608 datastream, field1 |
| 2 | 1 | 01 | CEA-608 datastream, field2 | CEA-608 datastream, field2 |
| 3 | 0 | 11 | 0x00 = END OF PACKET | 0x00 = END OF PACKET |
| 4 | 0 | 00 | 0x00 = padding | 0x00 = padding |
| 5 | 1 | 11 | byte#1 : DTVCC Packet Header | byte#2 : DTVCC Packet Data |
| 6 | 0 | 00 | 0x00 = padding | 0x00 = padding |
| 7 | 1 | 10 | byte#3 : DTVCC Packet Data | byte#4 : DTVCC Packet Data |
| 8 | 0 | 00 | 0x00 = padding | 0x00 = padding |
| 9 | 0 | 00 | 0x00 = padding | 0x00 = padding |
| .. | .. | .. | .. | .. |
| 20 | 1 | 10 | byte#31 : DTVCC Packet Data | byte#32 : DTVCC Packet Data |

FIG.23

HDMI-LLC Vendor-Specific Data Block (HDIM VSDB)

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1 | 24-bit IEEE Registration Identifier (0x000C03) (least significant byte first) | | | | | | | |
| 2 | | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd (0) | Rsvd (0) | DVI_Dual |
| 7 | Max_TMDS_Clock | | | | | | | |
| 8 | Latency_Fields_Present | I_Latency_Fields_Present | HDMI_Video_present | Closed Caption bit | CNC3 | CNC2 | CNC1 | CNC0 |
| ... | | | | | | | | |
| ()*...N | Reserved (0) | | | | | | | |

DATA TRANSMISSION DEVICE, DATA RECEPTION DEVICE, DATA TRANSMISSION METHOD, AND DATA RECEPTION METHOD

CROSS-REFERENCE TO RELATED APPLICATION

The present application claims priority from Japanese Patent Application No. JP 2010-117257 filed in the Japanese Patent Office on May 21, 2010, the entire content of which is incorporated herein by reference.

BACKGROUND OF THE INVENTION

1. Field of the Invention

The present invention relates to a data transmission device, a data reception device, a data transmission method, and a data reception method.

2. Description of the Related Art

In recent years, a digital interface such as a High Definition Multimedia Interface (HDMI) has become widespread as a communication interface via which image or voice data is transmitted at a high speed from a source device to a sync device. As a source device, there are given, for example, a game player, a Digital Versatile Disc (DVD) recorder, a set-top box, and other Audio Visual (AV) sources. As a sync device, there are given, for example, a television set, a projector, and other displays. The HDMI standard is described in details in High-Definition Multimedia Interface Specification Version 1.4, Jun. 5, 2009, for example.

Further, a source device, such as a set-top box, receives video data as well as closed caption data from a satellite in some cases. Closed Captioning is a technique of displaying captions on a television screen; the technique has been approved by U.S. federal communications commission and standardized in the United States to enable a hearing-impaired person or a person with a hearing loss to enjoy a TV broadcasting program or a video. Closed captioning is standardized as a Digital Television Closed Captioning (DTVCC) in CEA-708.

SUMMARY OF THE INVENTION

However, there existed no transmission scheme by which closed caption data was transmitted via a digital interface such as HDMI, and accordingly, there was a need to decode closed caption data and to mix decoded caption images into video data on the side of a source device and to transmit the closed caption data packetized to a sync device. For this reason, there existed issues, for example, a source device with no capability of decoding the close caption data could not handle closed caption data, and a sync device could not change display of closed captions.

In light of the foregoing, it is desirable to provide a data transmission device, a data reception device, a data transmission method, and a data reception method, which are novel and improved, and which are capable of transmitting closed caption data via a digital interface.

According to an embodiment of the present invention, there is provided a data transmission device including a transmission unit which transmits, via a transmission path to a data reception device, video data received by the data transmission device and packetizes closed caption data which was received by the data transmission device and transmits the closed caption data packetized via the transmission path to the data reception device, where the transmission path is constituted by a transmission channel included in a High Definition Multimedia Interface (HDMI) cable.

The data transmission device may further include an acquisition unit which acquires, via the transmission path, identification information which is stored in a storing unit of the data reception device and which indicates whether or not the data reception device can receive a packet of the closed caption data, and a distinction unit which distinguishes, based on the identification information acquired by the acquisition unit, whether or not the data reception device can receive a packet of the closed caption data.

The identification information may be Enhanced Extended Display Identification Data (E-EDID) which is stored in the storing unit.

The distinction unit may perform distinction whether or not the data reception device can receive a packet of the closed caption data, based on a Vendor Specific Data Block (VSDB) described in the E-EDID.

The transmission unit may transmit at least three packets of the closed caption data in every video cycle of the video data.

According to another embodiment of the present invention, there is provided a data reception device including a reception unit which receives, via a transmission path, video data transmitted from a data transmission device and receives, via the transmission path, packetized closed caption data which was transmitted from the data transmission device, a decoding unit which decodes closed caption data which was received and non-packetized by the reception unit, and a mixing unit which mixes caption images as decoding results by the decoding unit into video data received by the reception unit, where the transmission path is constituted by a transmission channel included in a High Definition Multimedia Interface (HDMI) cable.

The data reception device may further include a storing unit which stores identification information indicating whether or not the data reception device can receive a packet of the closed caption data.

The identification information may be Enhanced Extended Display Identification Data (E-EDID).

According to another embodiment of the present invention, there is provided a data transmission method including the step of transmitting, via a transmission path to a data reception device, video data received by a data transmission device, and packetizing closed caption data which was received by the data transmission device and transmitting the same via the transmission path to the data reception device, where the transmission path is constituted by a transmission channel included in a High Definition Multimedia Interface (HDMI) cable.

According to another embodiment of the present invention, there is provided a data reception method, including the steps of receiving, via a transmission path, video data transmitted by a data transmission device, and receiving, via the transmission path, packetized closed caption data which was transmitted by the data transmission device, decoding closed caption data which was received and was non-packetized in the step of receiving, and mixing caption images as decoding results in the step of decoding into video data received in the step of receiving, where the transmission path is constituted by a transmission channel included in a High Definition Multimedia Interface (HDMI) cable.

According to the embodiments of the present invention described above, it is possible to transmit closed caption data via a digital interface.

BRIEF DESCRIPTION OF THE DRAWINGS

FIG. 4 is an explanatory diagram illustrating an example of pin assignment for a HDMI receptacle;

FIG. 11 is an explanatory diagram for illustrating structure of closed caption data;

FIG. 12 is an explanatory diagram for illustrating packet types of closed caption packets;

FIG. 13 A is an explanatory diagram for illustrating structure of a closed caption packet;

FIG. 13 B is an explanatory diagram for illustrating structure of a closed caption packet;

FIG. 14 is an explanatory diagram for illustrating a body part of a closed caption packet;

FIG. 15 is an explanatory diagram for illustrating a cc_type flag;

FIG. 18 is an explanatory diagram for illustrating generation of closed caption data and transmission timing of a HDMI packet;

FIG. 19 is an explanatory diagram for illustrating mapping of closed caption data;

FIG. 20 is an explanatory diagram for illustrating mapping of closed caption data;

FIG. 21 is an explanatory diagram for illustrating mapping of closed caption data;

FIG. 23 is an explanatory diagram for illustrating a Closed Caption bit defined in a HDMI LLC VSDB.

DETAILED DESCRIPTION OF THE EMBODIMENTS

Figure 1:
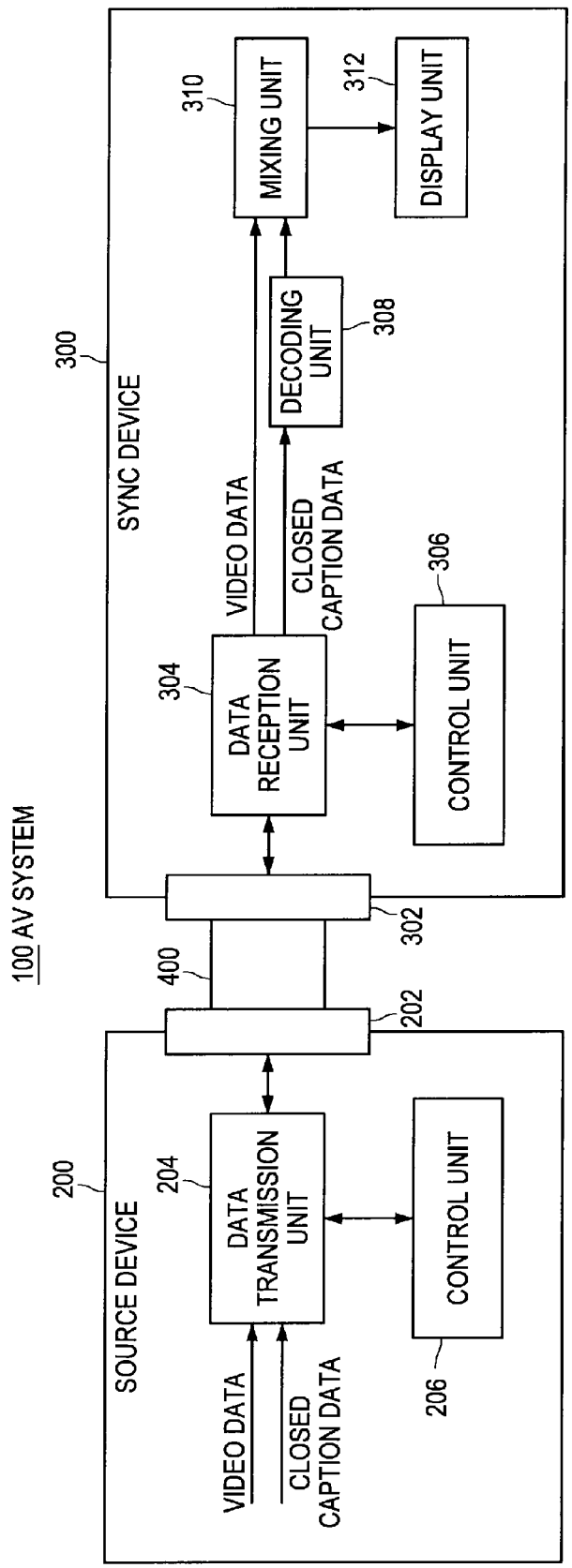
FIG. 1 is a block diagram schematically illustrating a configuration of an AV system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Explanation will be made in the following order.
Configuration of AV system
Configuration examples of data transmission unit and of data reception unit
Verification of transmission timing of closed caption data
Structure of closed caption data
Packet types of closed caption packets
Structure of closed caption packet
Generation of closed caption data and transmission timing of HDMI packet
Mapping of closed caption data
Closed caption packet transmission process

[1. Configuration of AV System]

First, an Audio and Visual (AV) system according to an embodiment of the present invention will be explained. FIG. 1 is a block diagram schematically illustrating a configuration of the AV system according to the present embodiment.

In FIG. 1, the AV system 100 includes a source device 200 and a sync device 300. The source device 200 is an AV source such as a game player, a disc player, a set-top box, a digital camera, and a mobile phone. The sync device 300 is, for example, a television set, or a projector.

The source device 200 and the sync device 300 are connected via a cable 400 with each other. A connector unit 202, to which a data transmission unit 204 is connected, is included in the source device 200. A connector unit 302, to which a data reception unit 304 is connected, is included in the sync device 300. An end of the cable 400 is connected to the connector unit 202 of the source device 200 while another end of the cable 400 is connected to the connector unit 302 of the sync device 300.

The source device 200 has a control unit 206. The control unit 206 is an example of an acquisition unit and of a distinction unit of the present invention. This control unit 206 controls the entire source device 200. The data transmission unit 204 of the source device 200 supports a digital interface according to the HDMI standard. For example, video data and closed caption data, which were received by the source device 200 from a satellite or the like, are input into the data transmission unit 204.

The sync device 300 has a control unit 306. This control unit 306 controls the entire sync device 300. The data reception unit 304 of the sync device 300 supports a digital interface according to the HDMI standard. The data reception unit 304 outputs, for example, video data and closed caption data, which were received from the source device 200.

The sync device 300 has a decoding unit 308. This decoding unit 308 decodes closed caption data, which was output by the data reception unit 304. The decoding unit 308 outputs decoded caption images.

The sync device 300 has a mixing unit 310. This mixing unit 310 mixes the caption images, output by the decoding unit 308, into video data, output by the data reception unit 304. Further, the mixing unit 310 outputs picture data in which the caption images has been mixed with the video data.

The sync device 300 has a display unit 312. This display unit 312 displays the picture data, which was output by the mixing unit 310.

[2. Configuration Examples of Data Transmission Unit and of Data Reception Unit]

Figure 2:
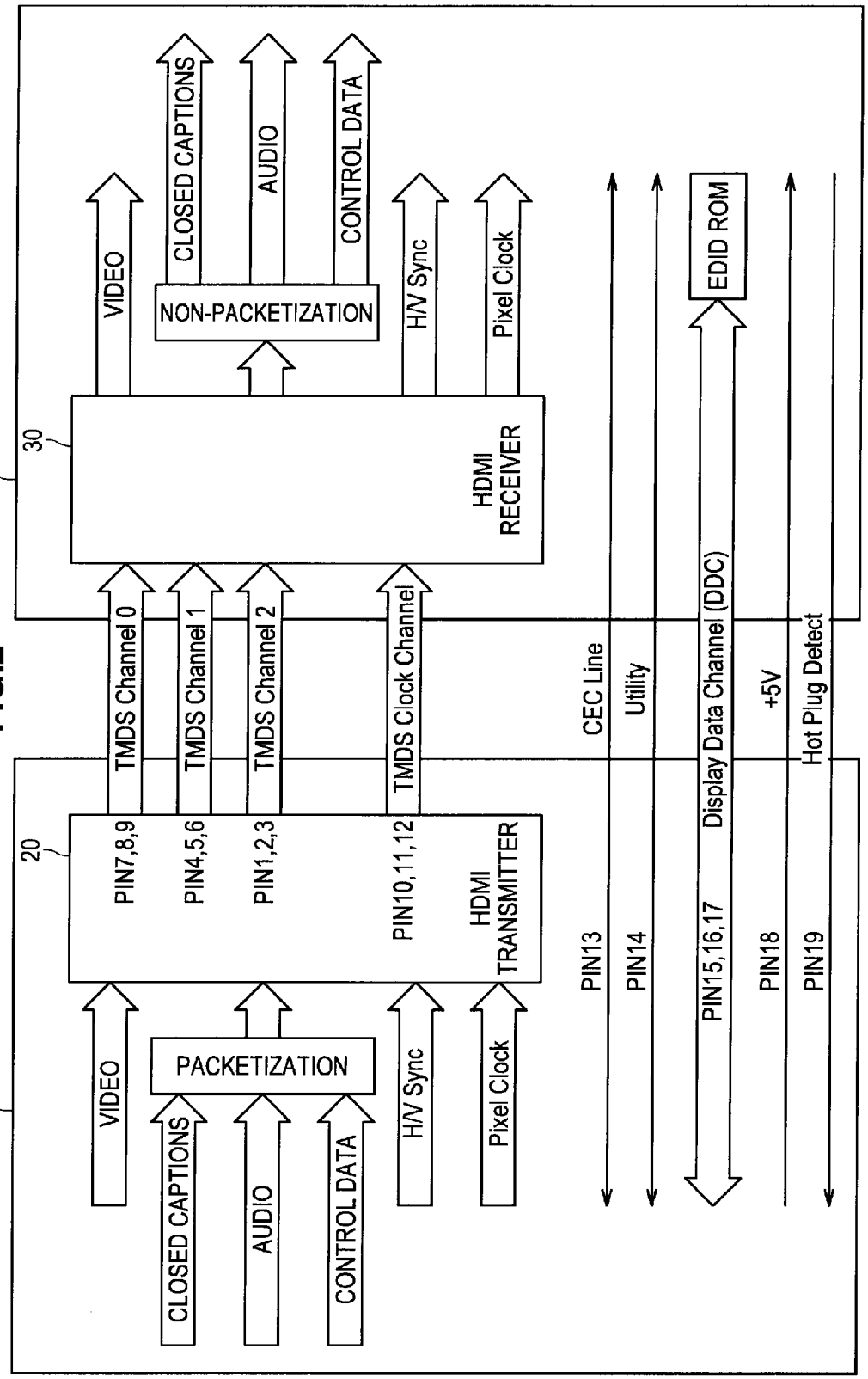
FIG. 2 is an explanatory diagram schematically illustrating configuration examples of a data transmission unit 204 of a source device 200 and of a sync device 300 of a data reception unit 304 in the AV system 100 of FIG. 1, respectively.

Next, the data transmission unit 204 of the source device 200 and the data reception unit 304 of the sync device 300 in the AV system 100 of FIG. 1 will be explained. FIG. 2 is an explanatory diagram schematically illustrating configuration examples of the data transmission unit 204 of the source device 200 and of the data reception unit 304 of the sync device 300 in the AV system 100 of FIG. 1, respectively. In these configuration examples, a digital interface between the data transmission unit 204 and the data reception unit 304 is a digital interface according to the HDMI standard.

The data transmission unit 204 transmits differential signals related to pixel data constituting an uncompressed image for one frame, unidirectionally to the data reception unit 304 on multiple channels, in a valid image interval (hereafter, appropriately referred to also as an active video interval). Here, a valid image interval is an interval in which a horizontal blanking interval and a vertical blanking interval are excluded from an interval from a vertical synchronization signal to the next vertical synchronization signal. Further, the data transmission unit 204 transmits differential signals related to, at least, closed caption data and voice data, which are associated with the image, control data, other auxiliary data, or the like, unidirectionally to the data reception unit 304 on multiple channels, in a horizontal blanking interval or in a vertical blanking interval.

As transmission channels for a HDMI system including the data transmission unit 204 and the data reception unit 304, there are given following transmission channels. That is, there are three TMDS channels #0-#2, each as a transmission channel for unidirectionally, serially transmitting pixel data and voice data from the data transmission unit 204 to the data reception unit 304, with the pixel data and the voice being synchronized with a pixel clock. Further, there is given a TMDS clock channel as a transmission channel for transmitting a TMDS clock.

The data transmission unit 204 has a HDMI transmitter 20. For example, this HDMI transmitter 20 converts pixel data constituting an uncompressed image into corresponding differential signals, and unidirectionally, serially transmits the same to the data reception unit 304 which is connected with the data transmission unit 204 via a HDMI cable, on three TMDS channel #0, #1, and #2, which are multiple channels.

Further, the HDMI transmitter 20 converts closed caption data and voice data, which are associated with the uncompressed image, necessary control data, other auxiliary data, and the like, into corresponding signals, and unidirectionaly, serially transmits the same to the data reception unit 304 on three TMDS channel #0, #1, and #2.

Furthermore, the HDMI transmitter 20 transmits to the data reception unit 304 which is connected with the data transmission unit 204 via a HDMI cable, on the TMDS clock channel, TMDS clocks which are synchronized with pixel data to be transmitted on three TMDS channels #0, #1, and #2. Here, 10 bits of data is transmitted on one TMDS channel #i (i=0, 1, 2), during one TMDS clock.

The data reception unit 304 receives differential signals related to pixel data, which are unidirectionally transmitted from the data transmission unit 204 on multiple channels in an active video interval. Further, this data reception unit 304 receives differential signals related to closed caption data as well as voice data, and control data, which are unidirectionally transmitted from the data transmission unit 204 on multiple channels in a horizontal blanking interval or in a vertical blanking interval.

Namely, the data reception unit 304 has a HDMI receiver 30. This HDMI receiver 30 receives differential signals related to pixel data, which are unidirectionally transmitted from the data transmission unit 204 on the TMDS channels #0, #1, and #2, and differential signals related to closed caption data as well as voice data, and control data. In this case, the data reception unit 304 receives the signals, while being synchronized with a pixel clock (a TMDS clock), which is transmitted from the data transmission unit 204 on the TMDS clock channel.

As a transmission channel for the HDMI system, there are given transmission channels, referred to as a Display Data Channel (DDC) and a CEC line, respectively, in addition to the TMDS channels #0-#2 and the TMDS clock channel described above. The DDC includes two signal lines (not shown) included in a HDMI cable. The DDC is used in order for the data transmission unit 204 to read out from the data reception unit 304 Enhanced Extended Display Identification Data (E-EDID).

Namely, the data reception unit 304 has, in addition to the HDMI receiver 30, an EDID ROM (Read Only Memory) storing E-EDID which is performance information related to performance (configuration/capability) of the data reception unit 304 itself. The EDID ROM is an example of a storing unit of the present invention. The data transmission unit 204 reads out, via the DDC, the E-EDID from the data reception unit 304 which is connected with the data transmission unit 204 via a HDMI cable, in response to a request from the control unit 206, for example.

The data transmission unit 204 transmits the E-EDID, which it read out, to the control unit 206. The control unit 206 stores the E-EDID in a flash ROM or a DRAM (both not shown). The control unit 206 can recognize, based on the E-EDID, setting of performance of the data reception unit 304, such as whether or not the data reception unit 304 can receive a packet of closed caption data. For example, the control unit 206 recognizes whether or not the sync device 300, which has the data reception unit 304, can handle closed caption data. For example, the control unit 206 recognizes whether or not the sync device 300, which has the data reception unit 304, can handle three-dimensional image data, and if the sync device 300 can handle three-dimensional image data, the control unit 304 further recognizes what kind of TMDS transmission data structure the sync device 300 can support, and the like.

The CEC line includes one signal line (not shown) included in a HDMI cable, and is used in order to bidirectionally communicate control data between the data transmission unit 204 and the data reception unit 304. The CEC line constitutes a control data line.

Further, a line (a HPD line) which is connected to a pin referred to as Hot Plug Detect (HPD) is included in a HDMI cable. By this HPD line, a source device can detect a sync device being connected thereto. Besides, this HPD line is used also as a HEAC − line which constitutes a bidirectional communication path. Further, a power line (+5V Power Line) used to supply power from a source device to a sync device is included in the HDMI cable. Further, a utility line is included in the HDMI cable. This utility line is used also as a HEAC+ line which constitutes a bidirectional communication path.

Figure 3:
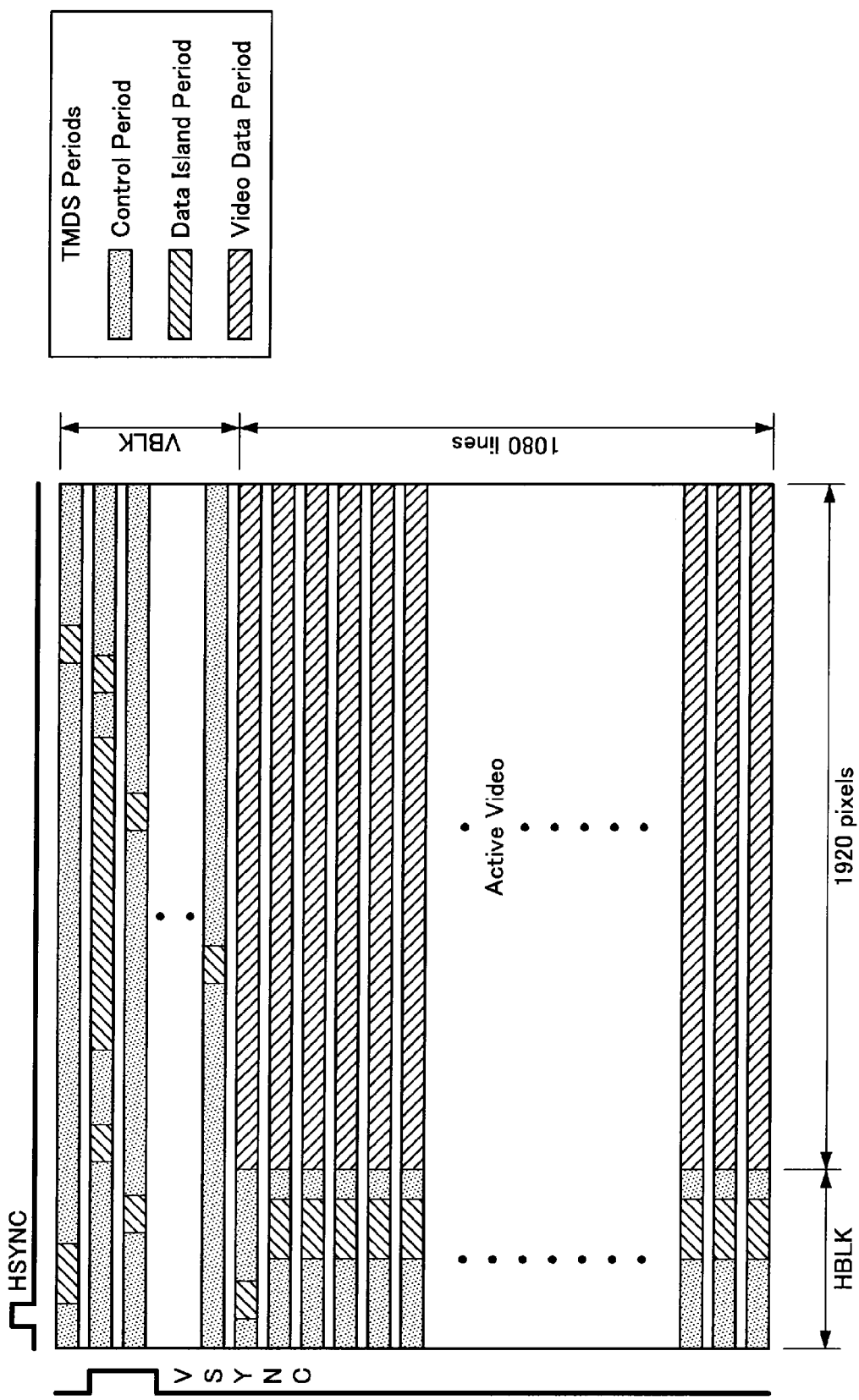
FIG. 3 is an explanatory diagram illustrating a structure example of TMDS transmission data.

FIG. 3 is an explanatory diagram illustrating a structure example of TMDS transmission data. FIG. 3 shows intervals for various types of transmission data in a case where image data being 1920 pixels by 1080 lines is transmitted on the TMDS channels #0, #1, and #2.

In a Video Field in which transmission data is transmitted on three TMDS channels #0, #1, and #2 for the HDMI system, there are three types of intervals in accordance with types of transmission data. As these three types of intervals, there are given a video data interval (a Video Data period), a Data Island interval (a Data Island period), and a Control interval (a Control period).

Here, the Video Field interval is an interval from a rising edge (an active edge) of a vertical synchronization signal to a rising edge of the next vertical synchronization signal. This Video Field interval is subdivided into a horizontal blanking period (horizontal blanking), a vertical blanking period (vertical blanking), and an Active Video interval (Active Video). This Active Video interval is an interval in which the horizontal blanking period and the vertical blanking period are excluded from the video field interval.

The Video Data interval is allocated to the Active Video interval. In this Video Data interval, data of valid pixels (Active Pixels) which constitute uncompressed image data for one frame of 1920 pixels×1080 lines is transmitted.

A Data Island interval and a Control interval are allocated to the horizontal blanking period and the vertical blanking period. In these Data Island interval and Control interval, Auxiliary data is transmitted. Namely, the Data Island interval is allocated to a part of the horizontal blanking period and of the vertical blanking period. In this Data Island period, control-irrelevant data of the Auxiliary data, for example, a packet for voice data is transmitted.

The Control interval is allocated to another part of the horizontal blanking period and of the vertical blanking period. In this Control interval, control-relevant data of the Auxiliary data, for example, a vertical synchronization signal as well as a horizontal synchronization signal, and a control packet are transmitted.

FIG. 4 is an explanatory diagram illustrating an example of pin assignment for a HDMI receptacle. Pin assignment shown in FIG. 4 is referred as to type-A. TMDS Data #i+ and TMDS Data #i−, which are differential signals of the TMDS channel #i, are transmitted by two lines which are differential lines. These two lines are connected to pins (whose pin number are 1, 4, and 7, respectively), to which the TMDS Data #i+ is allocated, and pins (whose pin number are 3, 6, and 9, respectively), to which the TMDS Data #i− is allocated.

Further, the CEC line, via which a CEC signal which is control data is transmitted, is connected to a pin whose pin number is 13. Further, a line, via which a Serial Data (SDA) signal such as E-EDID is transmitted, is connected to a pin whose pin number is 16. A line, via which a Serial Clock (SCL) signal, that is, a clock signal used for synchronization at the time of transmitting/receiving the SDA signal is transmitted, is connected to a pin whose pin number is 15. The above DDC includes the line via which a SDA signal is transmitted and the line via which a SCL signal is transmitted.

Further, as described above, the HPD line (a HEAC − line), by which a source device detects a sync device being connected thereto, is connected to a pin whose pin number is 19. Further, the utility line (a HEAC+line) is connected to a pin whose number is 14. Further, as described above, a power line for supplying power is connected to a pin whose pin number is 18.

[3. Verification of Transmission Timing of Closed Caption Data]

Next, transmission timing of closed caption data will be explained. FIGS. 5-10 are each an explanatory diagram for illustrating verification results of transmission timing of closed caption data.

Figure 5:
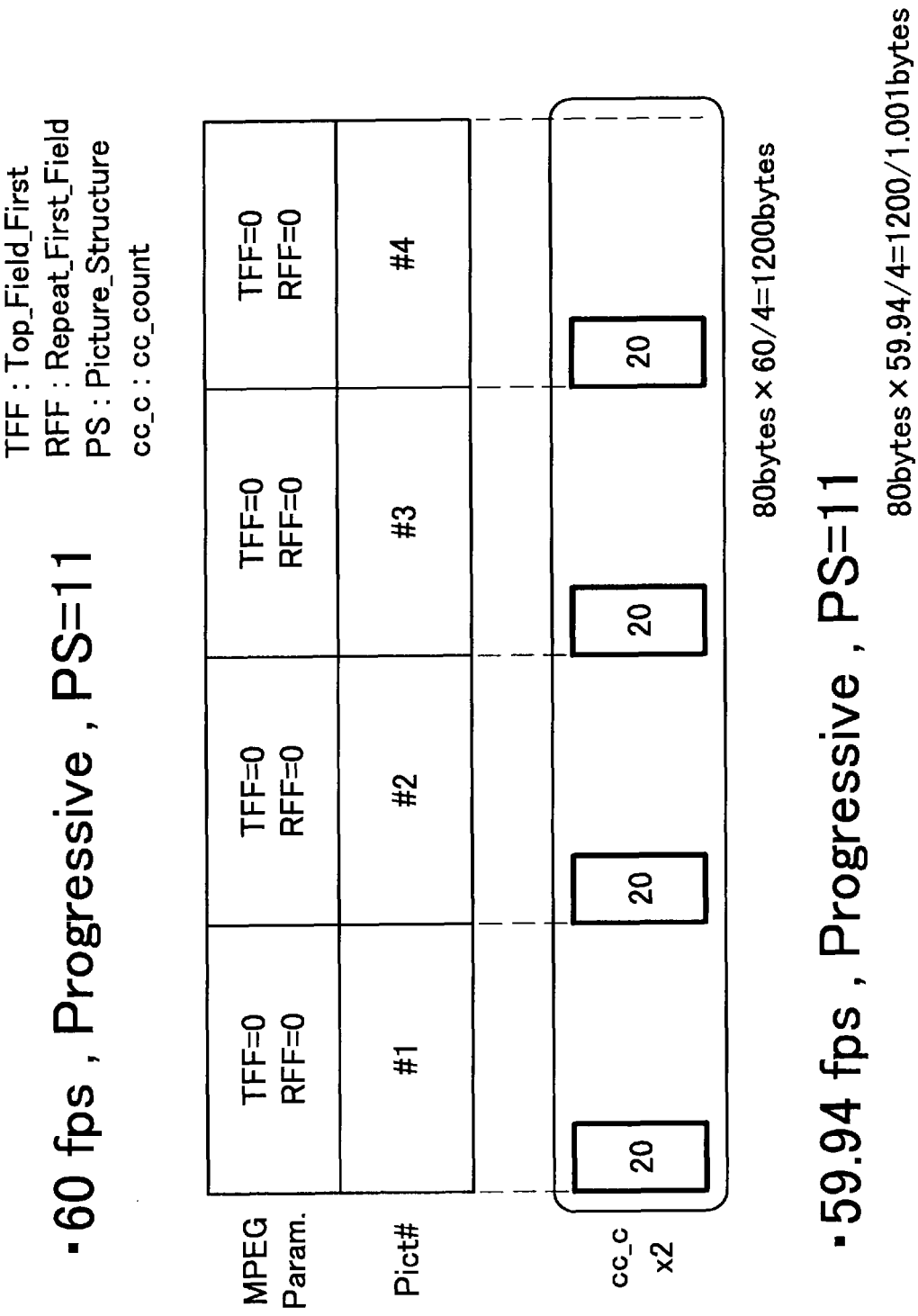
FIG. 5 is an explanatory diagram for illustrating verification results of transmission timing of closed caption data.

FIG. 5 shows a case where video data is sent in, by progressive scanning scheme, at a rate of 60 frames per sec. When Picture Structure (PS) of video data is 11, the source device 200 recognizes the corresponding video data as progressive scan type. Further, the source device 200 can recognize what kind of video data is sent thereto, using three pieces of tag information, that is, PS of the video data, Top Field First (TEF) and Repeat First Field (RFF) of a MPEG parameter. In this case, by the source device 200 transmitting 20 bytes of Closed Caption (CC) data in every video cycle, the CC data can be restored without any omission on the side of the sync device 300.

Figure 6:
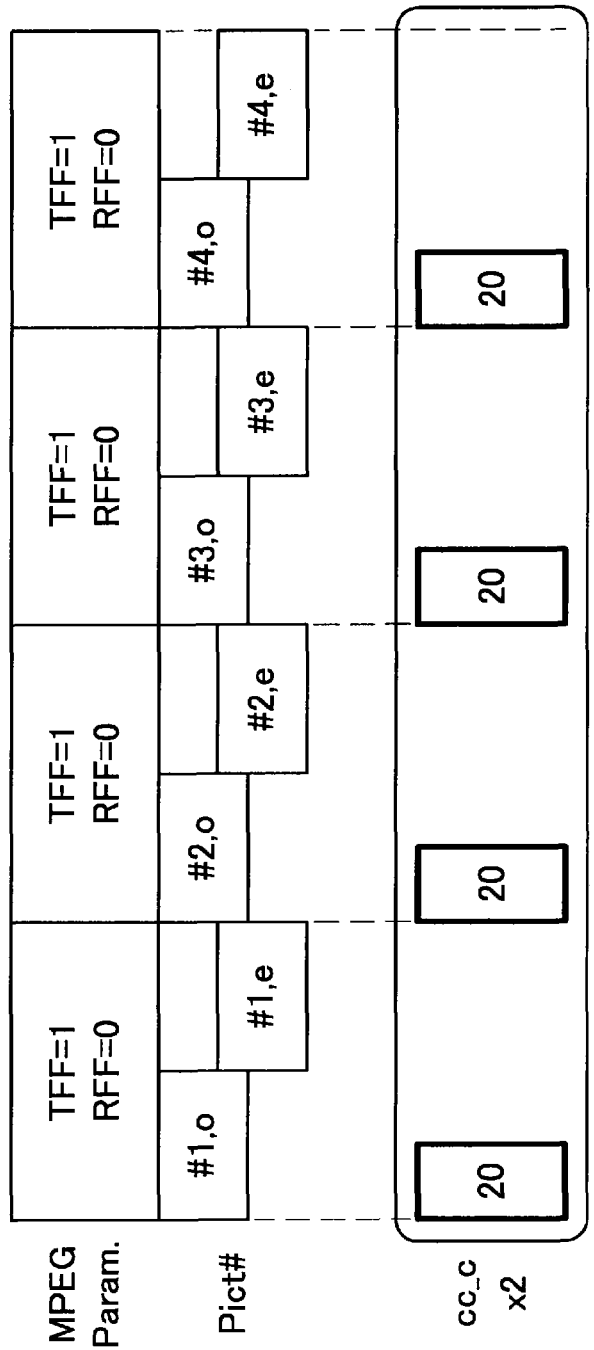
FIG. 6 is an explanatory diagram for illustrating verification results of transmission timing of closed caption data.

FIG. 6 shows a case where video data is sent in, by interlaced scanning scheme, at a rate of 30 frames per sec. When PS of the video data is 01/10, the source device 200 recognizes the corresponding video data as interlaced scan type. In this case, by the source device 200 transmitting 20 bytes of Closed Caption (CC) data in every video cycle, the CC data can be restored without any omission on the side of the sync device 300.

Figure 7:
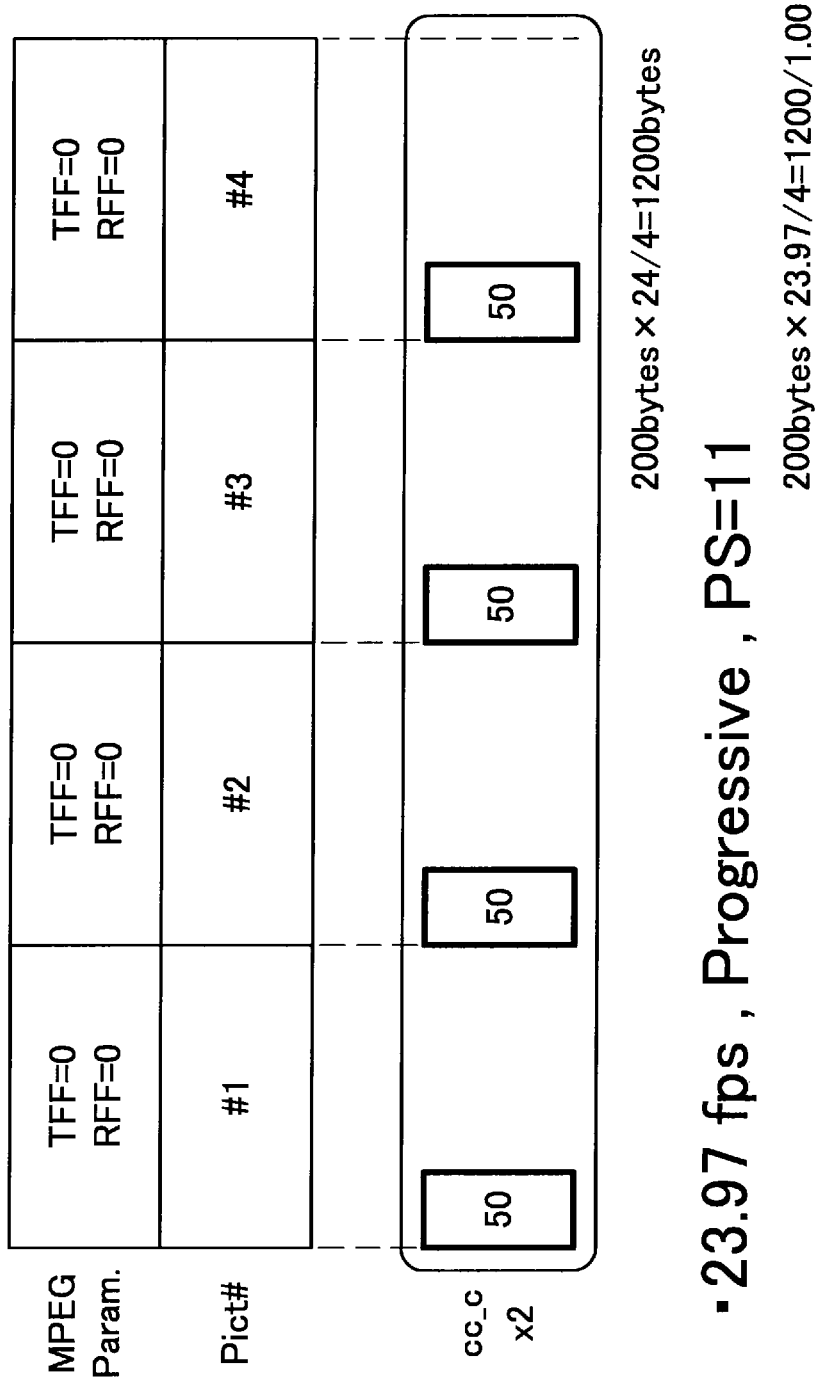
FIG. 7 is an explanatory diagram for illustrating verification results of transmission timing of closed caption data.

FIG. 7 shows a case where video data is sent in, by progressive scanning scheme, at a rate of 24 frames per sec. In this case, by the source device 200 transmitting 50 bytes of Closed Caption (CC) data in every video cycle, the CC data can be restored without any omission on the side of the sync device 300.

Figure 8:
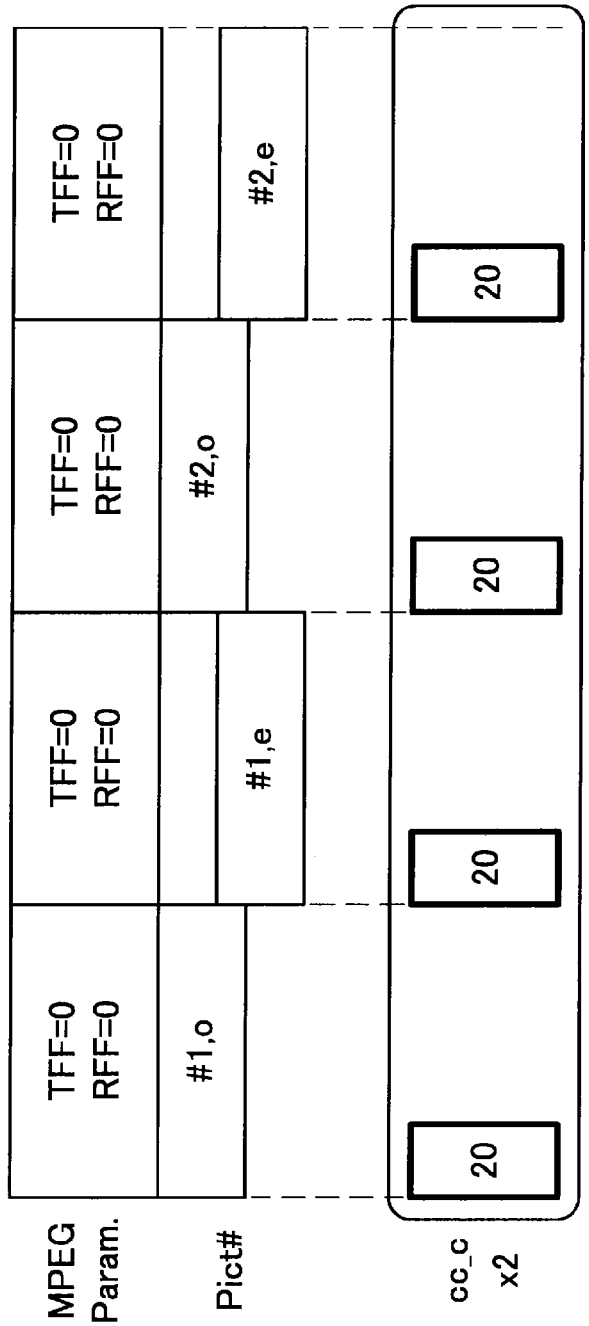
FIG. 8 is an explanatory diagram for illustrating verification results of transmission timing of closed caption data.

FIG. 8 shows a case where video data is sent in, by progressive scanning scheme, at a rate of 30 frames per sec. In this case, by the source device 200 transmitting 20 bytes of Closed Caption (CC) data in every video cycle, the CC data can be restored without any omission on the side of the sync device 300.

Figure 9:
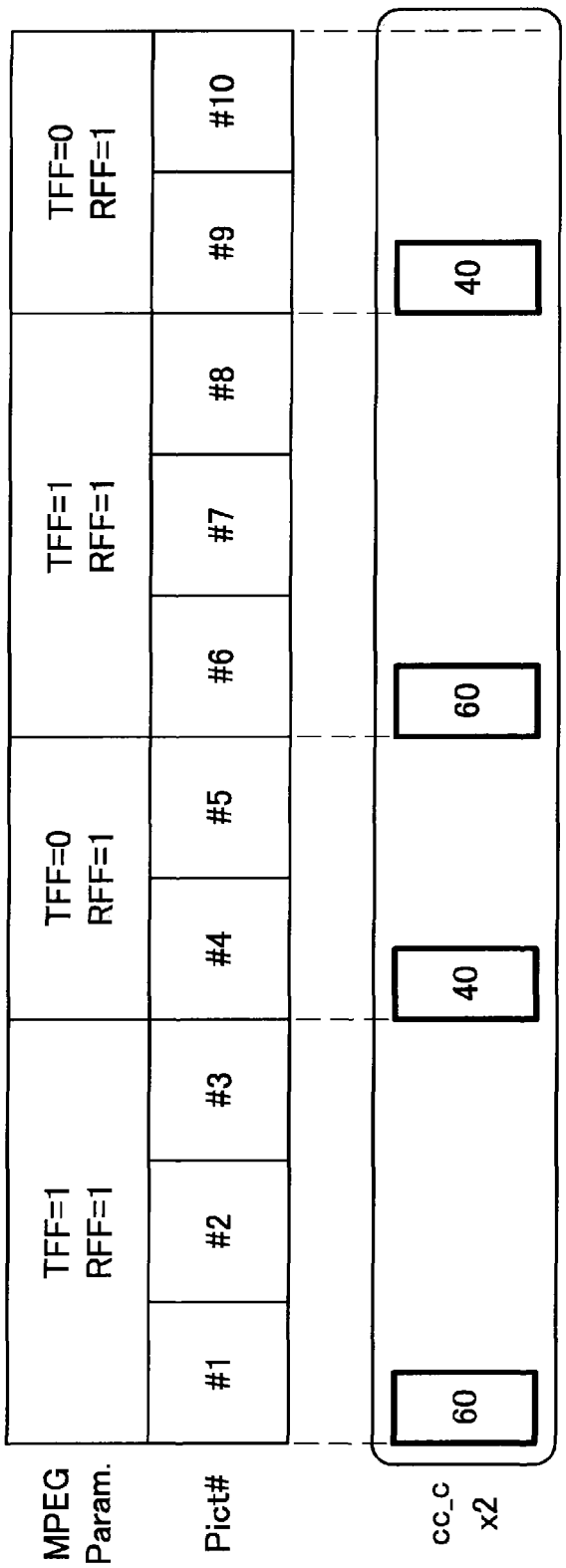
FIG. 9 is an explanatory diagram for illustrating verification results of transmission timing of closed caption data.

FIG. 9 shows a case where video data is sent in, by progressive scanning scheme with 2-3 pull down scheme, at a rate of 60 frames per sec. In this case, by the source device 200 transmitting 60 bytes of Closed Caption (CC) data in every 3 video cycles, the CC data can be restored without any omission on the side of the sync device 300.

Figure 10:
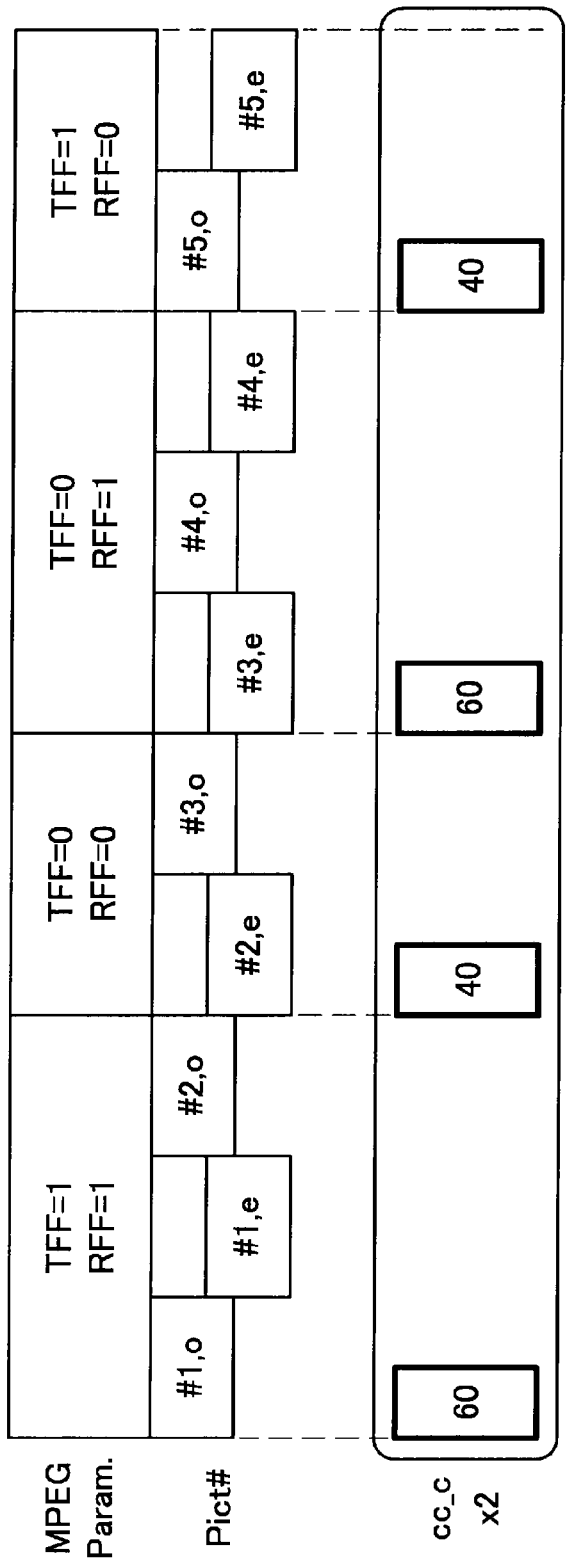
FIG. 10 is an explanatory diagram for illustrating verification results of transmission timing of closed caption data.

FIG. 10 shows a case where video data is sent in, by progressive scanning scheme with 2-3 pull-down scheme, at a rate of 30 frames per sec. In this case, by the source device 200 transmitting 60 bytes of Closed Caption (CC) data in every 1.5 video cycles, the CC data can be restored without any omission on the side of the sync device 300.

[4. Structure of Closed Caption Data]

Next, structure of closed caption data will be explained. FIG. 11 is an explanatory diagram for illustrating structure of closed caption data. The structure of closed caption data is as defined in CEA-708.

In the present embodiment, cc_valid, cc_type, cc_data_1, and cc_data_2, each constituting closed caption data, are transmitted in such a manner that the format thereof remains unchanged. On the other hand, one_bit, reserved, and the like, each constituting closed caption data, are transmitted after they have been converted into a HDMI format.

Further, as shown in FIG. 11, in addition to 2 bytes of data, that is, cc_data_1 and cc_data_2, 1 byte of data, such as a cc_valid flag for indicating validity of data and a cc_type flag for indicating types of data, are attached to closed caption data. For this reason, in order to cause CC data to be restored without any omission on the side of the sync device 300 in cases shown in FIGS. 5-10, an amount of data which is 1.5 times greater than an amount of the above CC data needs to be transmitted in every video cycle.

[5. Packet Types of Closed Caption Packets]

Next, packet types of closed caption packets will be explained. FIG. 12 is an explanatory diagram for illustrating packet types of closed caption packets.

In the present embodiment, packet types of closed caption packets are defined in the HDMI standard. For example, for a normal HDMI packet, a new packet type number 0x0B is acquired, and the packet type number 0x0B is defined as a packet type number of a closed caption packet. Besides, a scheme in which a packet, referred to as inforFrame, is referred may be also employed, the packet having been defined in the Consumer Electronics Association (CEA).

[6. Structure of Closed Caption Packet]

Next, structure of a closed caption packet will be explained. FIGS. 13A and 13B are explanatory diagrams for illustrating structure of a closed caption packet. FIG. 13A is an explanatory diagram for illustrating a header part of the closed caption packet. FIG. 13B is an explanatory diagram for illustrating a body part of the closed caption packet. In the present embodiment, a closed caption packet is subdivided into a header part and a body part.

As shown in FIG. 3A, a header part of a closed caption packet has the size of 3 bytes. HB0 indicates a packet type number. HB1 is reserved for future extension. In HB2, Length (5 bits) for indicating the number of a valid bit included in a body part of a closed caption packet and Packet_seq. (2 bits) for indicating, in a case where closed caption data is sent in multiple packets, to which part of the closed caption data a closed caption packet of interest corresponds are provided. When Packet_seq. (2 bits) is 0b00, 0b01 and 0b10, a closed caption packet of interest is an Intermediate packet, a First packet and a Last packet, respectively.

As shown in FIG. 13B, a body part of a closed caption packet has the size of 28 bytes. Hereafter, a body part of a closed caption packet will be explained in details. FIG. 14 is an explanatory diagram for illustrating a body part of a closed caption packet.

As shown in FIG. 14, closed caption data is placed in the body part. The closed caption data has the seize of 3 bytes, that is, 1 byte of data (PB #n) including a cc_valid flag for indicating validity of data and a cc_type flag for indicating data type, and 2 bytes of data (PB #n+1, PB #n+2). Besides, PB #n+1 and PB #n+2, for example, are sometimes included in a body part of the next closed caption packet, because a body part of a closed caption packet has the size of 28 bytes.

The cc_valid flag is a flag for indicating whether or not following 2 bytes of data are valid, and when the flag is set to 1, the following 2 bytes of data are valid: when the flag is set to 0, the following 2 bytes of data are not valid.

The cc_type flag is a flag for indicating types of following 2 bytes of data. As shown in FIG. 15, when the flag is set to 00 or 01, it is closed caption data as defined in CEA-608-E; when the flag is set to 10 or 11, it is closed caption data as defined in CEA-708.

[7. Generation of Closed Caption Data and Transmission Timing of HDMI Packet]

Figure 16:
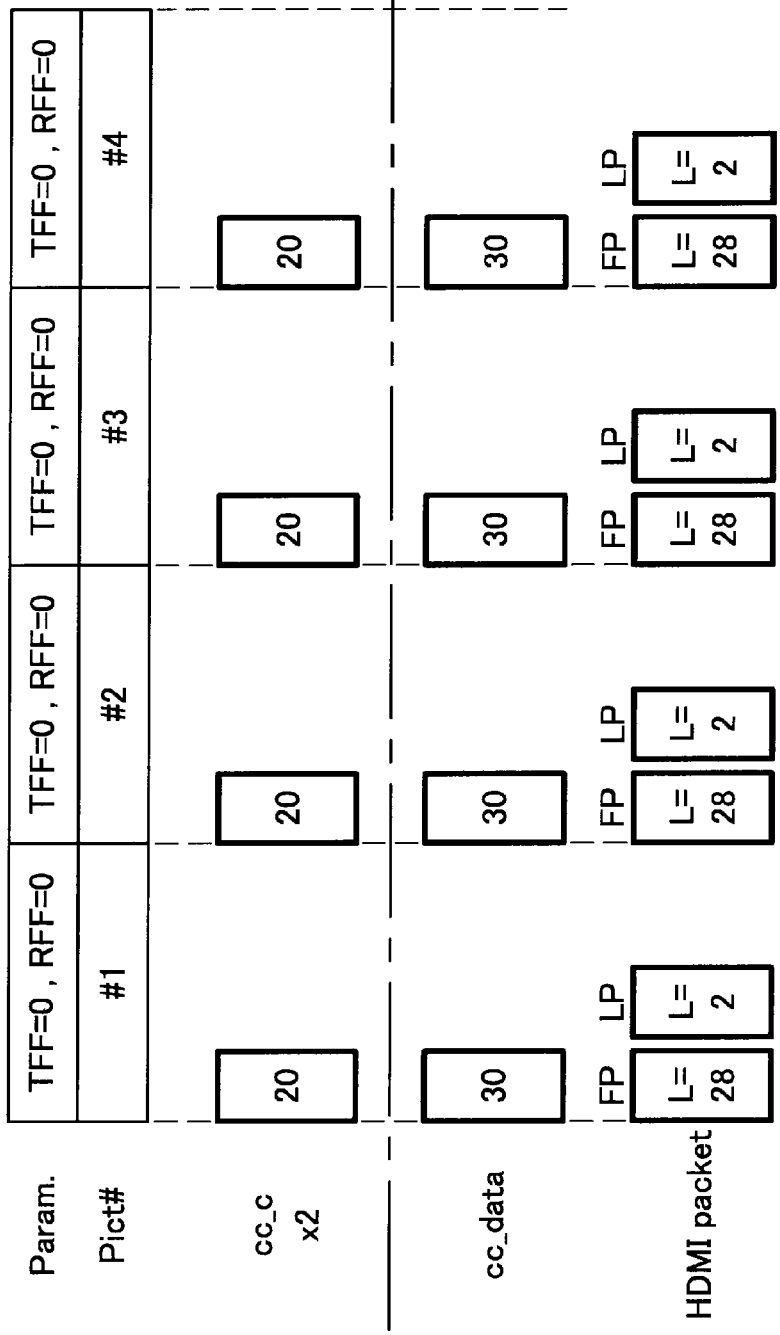
FIG. 16 is an explanatory diagram for illustrating generation of closed caption data and transmission timing of a HDMI packet.
Figure 17:
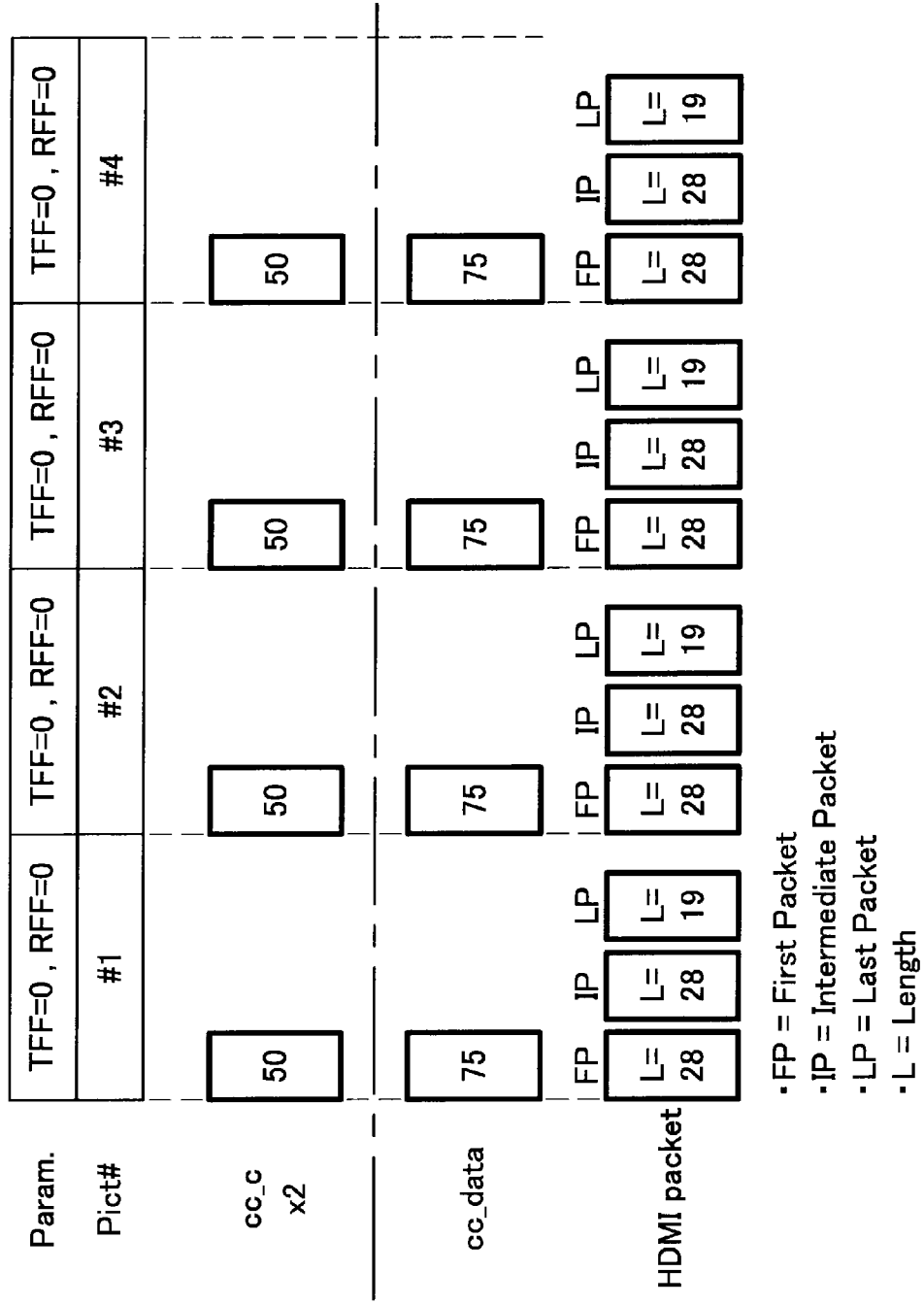
FIG. 17 is an explanatory diagram for illustrating generation of closed caption data and transmission timing of a HDMI packet.

Next, generation of closed caption data and transmission timing of a HDMI packet will be explained. FIGS. 16-18 are explanatory diagrams for illustrating generation of closed caption data and transmission timing of a HDMI packet.

FIG. 16 shows a case where video data is sent in, by progressive scanning scheme, at a rate of 60 frames per sec. In this case, a source device 200 needs to transmit 30 bytes of closed caption data in every video cycle. Accordingly, the source device 200 needs to be provided with capability of transmitting at least two closed caption packets, each as a HDMI packet, in every video cycle.

FIG. 17 shows a case where video data is sent in, by progressive scanning scheme, at a rate of 24 frames per sec. In this case, a source device 200 needs to transmit 75 bytes of closed caption data in every video cycle. Accordingly, the source device 200 needs to be provided with capability of transmitting at least three closed caption packets, each as a HDMI packet, in every video cycle.

FIG. 18 shows a case where video data is sent in, by progressive scanning scheme with 2-3 pull-down scheme, at a rate of 30 frames per sec. In this case, a source device 200 needs to transmit at least 90 bytes of closed caption data in every 1.5 video cycles. Accordingly, the source device 200 needs to be provided with capability of transmitting at least four closed caption packets, each as a HDMI packet, in every 1.5 video cycles.

[8. Mapping of Closed Caption Data]

Next, mapping of closed caption data will be explained. FIGS. 19-21 are explanatory diagrams for illustrating mapping of closed caption data.

FIGS. 19-21 show examples in which closed caption data, taken as an example in CEA-708-D, is mapped onto HDMI packets. According to the present embodiment, as shown in FIGS. 19-21, it is possible to map closed caption data without any omission onto HDMI packets.

[9. Closed Caption Packet Transmission Process]

Figure 22:
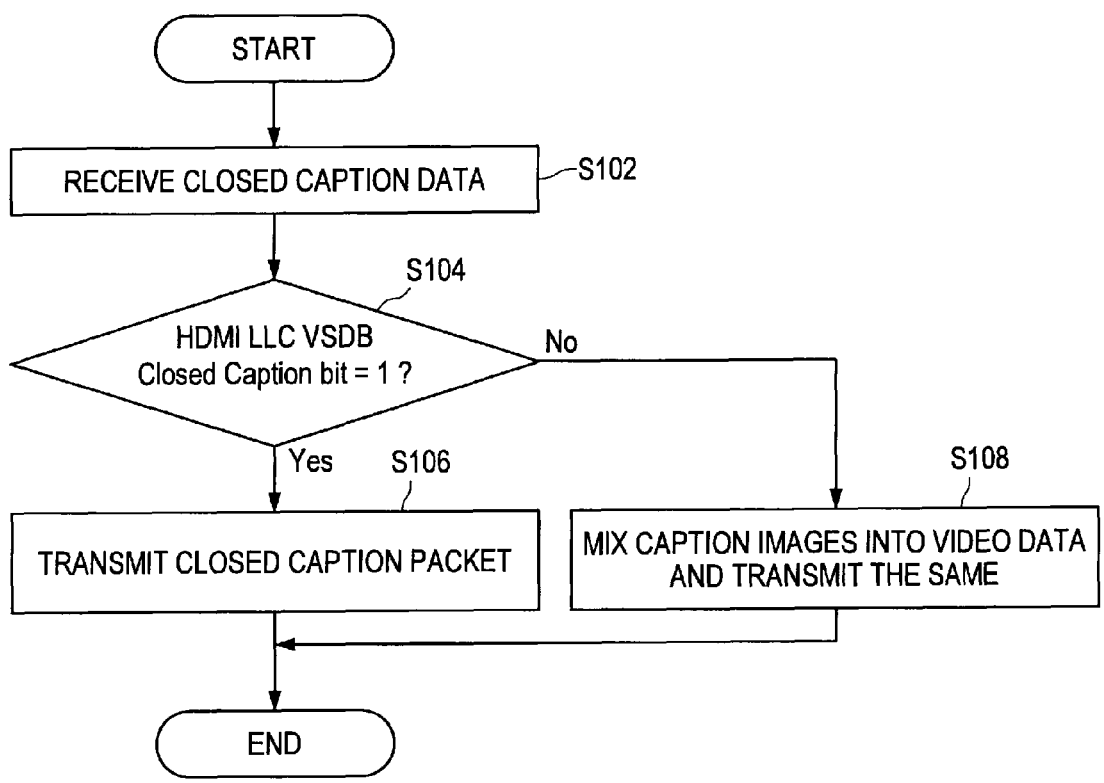
FIG. 22 is a flowchart of closed caption packet transmission process performed by the source device 200 in the AV system 100 of FIG. 1.

Next, closed caption packet transmission process performed by the source device 200 in the AV system 100 of FIG. 1 will be explained. FIG. 22 is a flowchart of closed caption packet transmission process performed by the source device 200 in the AV system 100 of FIG. 1.

In FIG. 22, first, the source device 200 receives closed caption data from a satellite, or the like (step S102).

Next, the data transmission unit 204 of the source device 200 reads out, according to control by the control unit 206, via the DDC, E-EDID stored in an E-EDID ROM of the data reception unit 304, and transmits the E-EDID, which the data transmission unit 204 read out, to the control unit 206. Then, the control unit 206 distinguishes, based on the E-EDID, whether or not a Closed Caption bit in a HDMI LLC VSDB (Vendor-Specific Data Block) is 1 (step S104). In the present embodiment, as shown in FIG. 23, a Closed Caption bit is defined in a HDMI LLC VSDB. For example, the Closed Caption bit is defined as bit 4 of Byte #8 in the HDMI LLC VSDB. When the Closed Caption bit is set to 1, the sync device 300 has the capability of receiving a closed caption packet. On the other hand, when the Closed Caption bit is set to 0, the sync device 300 has no capability of receiving a closed caption packet.

When, as a result of the distinction in the step S104, the Closed Caption bit is 1 (in case of YES in the step S104), the data transmission unit 204 transmits, according to control by the control unit 206, a closed caption packet to the sync device 300 (step S106), so that the present process is terminated.

When, as a result of the distinction in the step S104, the Closed Caption bit is 0 (in case of NO in the step S104), according to control by the control unit 20, closed caption data is decoded on the side of the source device 200, and decoded caption images are mixed into video data. And the data transmission unit 204 transmits the video data, into which the caption images were mixed, to the sync device 300 (step S108), so that the present processing is terminated.

According to the closed caption packet transmission process in FIG. 22, when the sync device 300 has the capability of receiving a closed caption packet, the source device 200 transmits a closed caption packet to the sync device 300. That is, the source device 200 transmits, as data, video data and closed caption data in parallel via the HDMI. Thereby, decoding of closed caption data can be performed on the side of the sync device 300. Accordingly, decoded caption images can be made in a form suitable for setting on the sync device 300. For example, it is possible to change the color of a caption image to an eye-friendly color on the side of the sync device 300. Besides, most of the sync devices 300 have a built-in tuner (not shown), and have accordingly the capability of decoding closed caption data. For this reason, even when decoding of closed caption data is performed on the side of the sync device 300, the sync device 300 does not have to be newly provided with decode function, thereby not resulting in price increase of the sync device 300. On the other hand, it is possible to provide the source device 200 at a low price, which has no capability of decoding closed caption data, so that the market is activated.

Moreover, embodiments of the present invention may be also implemented by providing a system or a device with a recoding medium storing program codes of software that realizes functions of the above embodiments and by causing the computer (or CPU, MPU, or the like) of the system or the device to read out and to execute the program codes stored in the recoding medium.

In this case, the program codes itself, which is read out from the recoding medium, realize the functions of the above embodiments, and the program codes and the recoding medium storing the program codes constitute the present invention.

Further, as a recoding medium for providing program codes, for example, a floppy disk (registered trademark), a hard disk, a magneto-optical disk, an optical disk such as a CD-ROM, a CD-R, a CD-RW, a DVD-ROM, a DVD-RAM, a DVD-RW, and a DVD+RW, a magnetic tape, a nonvolatile memory card, a ROM, and the like may be used. Alternatively, program codes may be downloaded via a network.

Furthermore, the functions of the above embodiments may be realized not only by executing program codes read out by a computer, but also by causing, based on instructions of such program codes, an operating system (OS) running on the computer, or the like, to perform a part or whole parts of actual processing.

Moreover, the functions of the above embodiments may be realized, after program codes read out from a recoding medium are written into a memory provided on an extension board inserted into a computer or which is provided in an extension unit connected to a computer, by causing, based on instructions of such program codes, a CPU or the like provided on the extension board or in the extension unit to perform a part or whole parts of actual processing.

It should be understood by those skilled in the art that various modifications, combinations, sub-combinations and alterations may occur depending on design requirements and other factors insofar as they are within the scope of the appended claims or the equivalents thereof.

What is claimed is:

1. A data transmission device comprising
   a transmission unit which transmits, via a transmission path to a data reception device, video data received by the data transmission device and packetizes closed caption data which was received by the data transmission device and transmits the closed caption data packetized via the transmission path to the data reception device; and
   a distinction unit which distinguishes, based on identification information, whether or not the data reception device can receive a packet of the closed caption data,
   wherein the transmission path is constituted by a transmission channel included in a High Definition Multimedia Interface (HDMI) cable, and
   wherein the identification information includes a pre-defined bit which indicates whether or not the data reception device can receive the packet of the closed caption data, in which the pre-defined bit is located in byte number 8 of a HDMI Vendor Specific Data Block (VSDB).

2. The data transmission device according to claim 1, further comprising:
   an acquisition unit which acquires, via the transmission path, the identification information which is stored in a storing unit of the data reception device.

3. The data transmission device according to claim 2,
   wherein the identification information is Enhanced Extended Display Identification Data (E-EDID) which is stored in the storing unit.

4. The data transmission device according to claim 1,
   wherein the transmission unit transmits at least three packets of the closed caption data in every video cycle of the video data.

5. A data reception device comprising:
   a reception unit which receives, via a transmission path, video data transmitted from a data transmission device and receives, via the transmission path, packetized closed caption data which was transmitted from the data transmission device;
   a decoding unit which decodes closed caption data which was received and non-packetized by the reception unit;
   a mixing unit which mixes caption images as decoding results by the decoding unit into video data received by the reception unit; and
   a storing unit which stores identification information indicating whether or not the data reception device can receive a packet of the closed caption data,
   wherein the transmission path is constituted by a transmission channel included in a High Definition Multimedia Interface (HDMI) cable,
   wherein the stored identification information is supplied to the data transmission device, and
   wherein the identification information includes a pre-defined bit which indicates whether or not the data reception device can receive the packet of the closed caption data, in which the pre-defined bit is located in byte number 8 of a HDMI Vendor Specific Data Block (VSDB).

6. The data reception device according to claim 5,
   wherein the identification information is Enhanced Extended Display Identification Data (E-EDID).

7. A data transmission method comprising the steps of:
   transmitting, via a transmission path to a data reception device, video data received by a data transmission device, and packetizing closed caption data which was received by the data transmission device, and transmitting the closed caption data packetized via the transmission path to the data reception device; and
   distinguishing, based on identification information, whether or not the data reception device can receive a packet of the closed caption data,
   wherein the transmission path is constituted by a transmission channel included in a High Definition Multimedia Interface (HDMI) cable, and
   wherein the identification information includes a pre-defined bit which indicates whether or not the data reception device can receive the packet of the closed caption data, in which the pre-defined bit is located in byte number 8 of a HDMI Vendor Specific Data Block (VSDB).

8. A data reception method, comprising the steps of:
   receiving, via a transmission path, video data transmitted by a data transmission device, and receiving, via the transmission path, packetized closed caption data which was transmitted by the data transmission device;
   decoding closed caption data which was received and was non-packetized in the step of receiving;
   mixing caption images as decoding results in the step of decoding into video data received in the step of receiving; and
   storing identification information indicating whether or not the data reception device can receive a packet of the closed caption data and supplying the stored identification information to the data transmission device, wherein the transmission path is constituted by a transmission channel included in a High Definition Multimedia Interface (HDMI) cable, and wherein the identification information includes a pre-defined bit which indicates whether or not the data reception device can receive the packet of the closed caption data, in which the pre-defined bit is located in byte number 8 of a HDMI Vendor Specific Data Block (VSDB).

9. The data transmission device according to claim 1, in which the pre-defined bit is bit 4 in the byte number 8 of the HDMI VSDB.

10. The data reception device according to claim 5, in which the pre-defined bit is bit 4 in the byte number 8 of the HDMI VSDB.

11. The data transmission method according to claim 7, in which the pre-defined bit is bit 4 in the byte number 8 of the HDMI VSDB.

12. The data reception method according to claim 8, in which the pre-defined bit is bit 4 in the byte number 8 of the HDMI VSDB.

* * * * *